United States Patent
West (10) Patent No.: US 6,921,038 B2
(45) Date of Patent: Jul. 26, 2005

(54) APPARATUS AND METHOD TO RELEASEABLY ATTACH A TAPE LEADER PIN

(75) Inventor: Richard A. West, Corona, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/641,562

(22) Filed: Aug. 15, 2003

(65) Prior Publication Data

US 2005/0035237 A1 Feb. 17, 2005

(51) Int. Cl.[7] .................................................. G11B 15/66
(52) U.S. Cl. ................................... 242/332.4; 360/132
(58) Field of Search ............................. 242/332, 332.4, 242/532, 532.1, 532.5, 332.7; 360/95, 132

(56) References Cited

U.S. PATENT DOCUMENTS

| | | | |
|---|---|---|---|
| 4,330,096 A | * 5/1982 | Bartel et al. ............. 242/532.1 |
| 4,608,614 A | * 8/1986 | Rinkleib et al. ............... 360/95 |
| 4,903,153 A | 2/1990 | Inoue .......................... 360/93 |
| 4,922,353 A | 5/1990 | Inoue ........................ 360/96.5 |
| 5,673,155 A | 9/1997 | Motoyama et al. ........... 360/92 |
| 5,793,563 A | 8/1998 | Katsuyama et al. .......... 360/92 |
| 5,927,633 A | * 7/1999 | McAllister ............... 242/348.2 |
| 5,979,813 A | * 11/1999 | Mansbridge et al. ...... 242/332.4 |
| 6,034,839 A | * 3/2000 | Hamming ..................... 360/95 |
| 6,392,837 B1 | 5/2002 | Kim .......................... 360/96.5 |
| 6,459,924 B1 | * 10/2002 | Creighton et al. |
| 6,471,150 B1 | * 10/2002 | Tsuchiya et al. ......... 242/332.4 |
| 6,697,212 B2 | * 2/2004 | Tsuchiya ..................... 360/95 |

FOREIGN PATENT DOCUMENTS

| JP | 8195003 A | 7/1996 |
|---|---|---|
| JP | 2001135003 A | 5/2001 |

* cited by examiner

Primary Examiner—William A. Rivera
(74) Attorney, Agent, or Firm—Dale F. Regelman (57) ABSTRACT

A threader block assembly disposed in a tape drive, where that threader block assembly includes a first moveable arm, a second moveable arm pivotally connected to the first moveable arm, and a magnet disposed on the second moveable arm. A tape drive which includes the threader block. A data storage and retrieval system which includes one or more tape drives comprising the threader block. A method to attach a tape leader pin to a threader block assembly disposed in a tape drive, where that tape leader pin is disposed on one end of a magnetic tape. The method includes disposing a magnet on the threader block assembly, forming the leader pin from a paramagnetic material, and attaching the leader pin to the threader block assembly with a magnetic force.

22 Claims, 9 Drawing Sheets

APPARATUS AND METHOD TO RELEASEABLY ATTACH A TAPE LEADER PIN

FIELD OF THE INVENTION

Applicant's invention relates to an apparatus and method to releaseably attach a tape leader pin to a tape drive assembly. More particularly, Applicant's invention relations to an apparatus and method to releaseably attach a tape leader pin to a moveable threader block assembly disposed in a tape drive unit.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape medium housed in a portable cartridge.

One (or more) accessors typically accesses a tape cartridge from its storage slots and delivers that cartridge to a data storage device for reading and/or writing data on the accessed media. Suitable electronics operate the accessor(s) and operate the data storage device(s) to provide information to, and/or to receive information from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3584 TotalStorage® Library (TotalStorage is a registered trademark of International Business Machines Corporation). Some of the automated media storage libraries have dual or multiple accessors to provide a level of redundancy and to enhance performance.

SUMMARY OF THE INVENTION

Applicant's invention includes a threader block assembly disposed in a tape drive. Applicant's threader block assembly includes a first moveable arm, a second moveable arm pivotally connected to the first moveable arm, and one or more magnets disposed on the second moveable arm.

Applicant's invention further includes a method to attach a tape leader pin to a threader block assembly disposed in a tape drive, where that tape leader pin is disposed on one end of a magnetic tape. Applicant's method includes disposing one or more magnets on the threader block assembly, forming the leader pin from a paramagnetic material, and attaching the leader pin to the threader block assembly with a magnetic force.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method is not meant, however, to limit Applicant's invention to either data storage and retrieval systems, or to data processing applications, as the invention herein can be applied to use of magnetic tape media in general.

Figure 1:
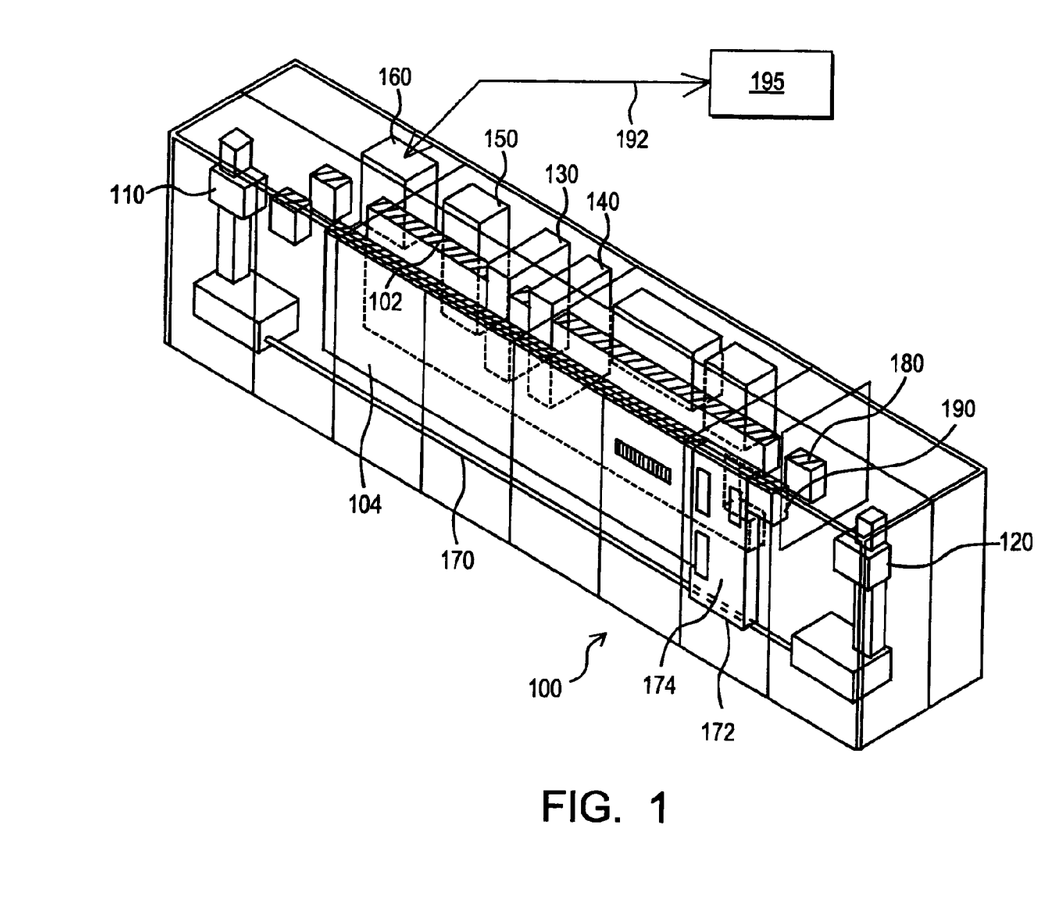
FIG. 1 is a perspective view of a first embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. As shown in FIG. 1, accessors 110 and 120 travel bi-directionally along rail 170 in an aisle disposed between first wall of storage slots 102 and second wall of storage slots 104.

In certain embodiments, device 160 comprises a library controller. In certain of these embodiments, library controller 160 is integral with a computer. In other embodiments, Applicant's data storage and retrieval system utilizes a distributed control network. In these distributed control network embodiments, device 160 may comprise a motion card pack. Device 160 communicates with one or more host computers, such as host computer 195, via communication link 192.

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

Figure 2:
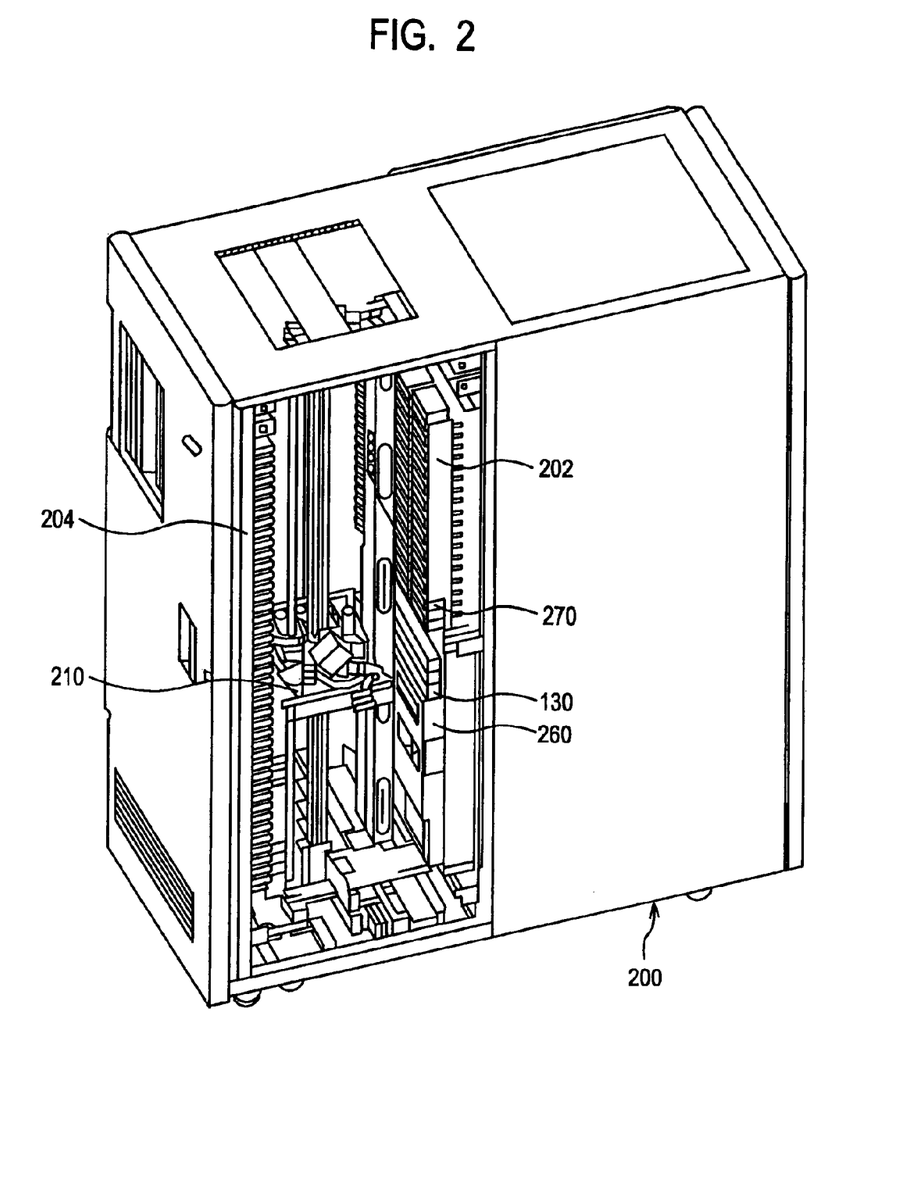
FIG. 2 is a perspective view of a second embodiment of Applicant's data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes one or more data storage devices, such as device 130. Data storage device 130 comprises a magnetic tape drive. System 200 further includes controller/motion card pack 260. System 200 further includesan operator control panel.

System 200 further includes one or a plurality of portable data storage cartridges, such as cartridges 270, removeably disposed in one or more slots in storage walls 202/204. Each such cartridge contains a tape storage medium internally disposed therein. System 200 also includes at least one robotic accessor 210 for transporting a designated tape storage medium between a storage slot disposed in first wall 202 or second wall 204 and data storage device 130.

As those skilled in the art will appreciate, in order to read and/or write information from and/or to a magnetic tape, that tape must first be accessed from its storage cassette and properly threaded in a tape drive, such as tape drive 130 (FIGS. 1, 2)/140 (FIG. 1). In order to thread the tape in the tape drive, the tape includes a leader pin disposed on one end. The tape drive includes a threader block with includes a leader pin fixturing mechanism.

After a tape cartridge is inserted into the tape drive, the threader block assembly accesses the leader pin disposed on the magnetic tape, and releaseably attaches that leader pin. Applicant's invention includes an apparatus and method to releaseably attach a tape leader pin to Applicant's threader block assembly. After removeably disposing a tape cartridge in Applicant's tape drive unit, the threading operation automatically commences. In the event the leader pin is prematurely released from the threader block, the threading operation does not complete correctly. Because the tape drive is unable to rewind the improperly threaded tape and again attempt to thread the tape, the tape drive requires manual disassembly, repair, and reassembly. As those skilled in the art will appreciate, such manual intervention is costly and necessarily requires the tape drive be taken out of service. Using Applicant's apparatus and method, however, a tape leader pin is more securely attached to the threader block assembly thereby decreasing the likelihood of premature leader pin release.

Figure 3A:
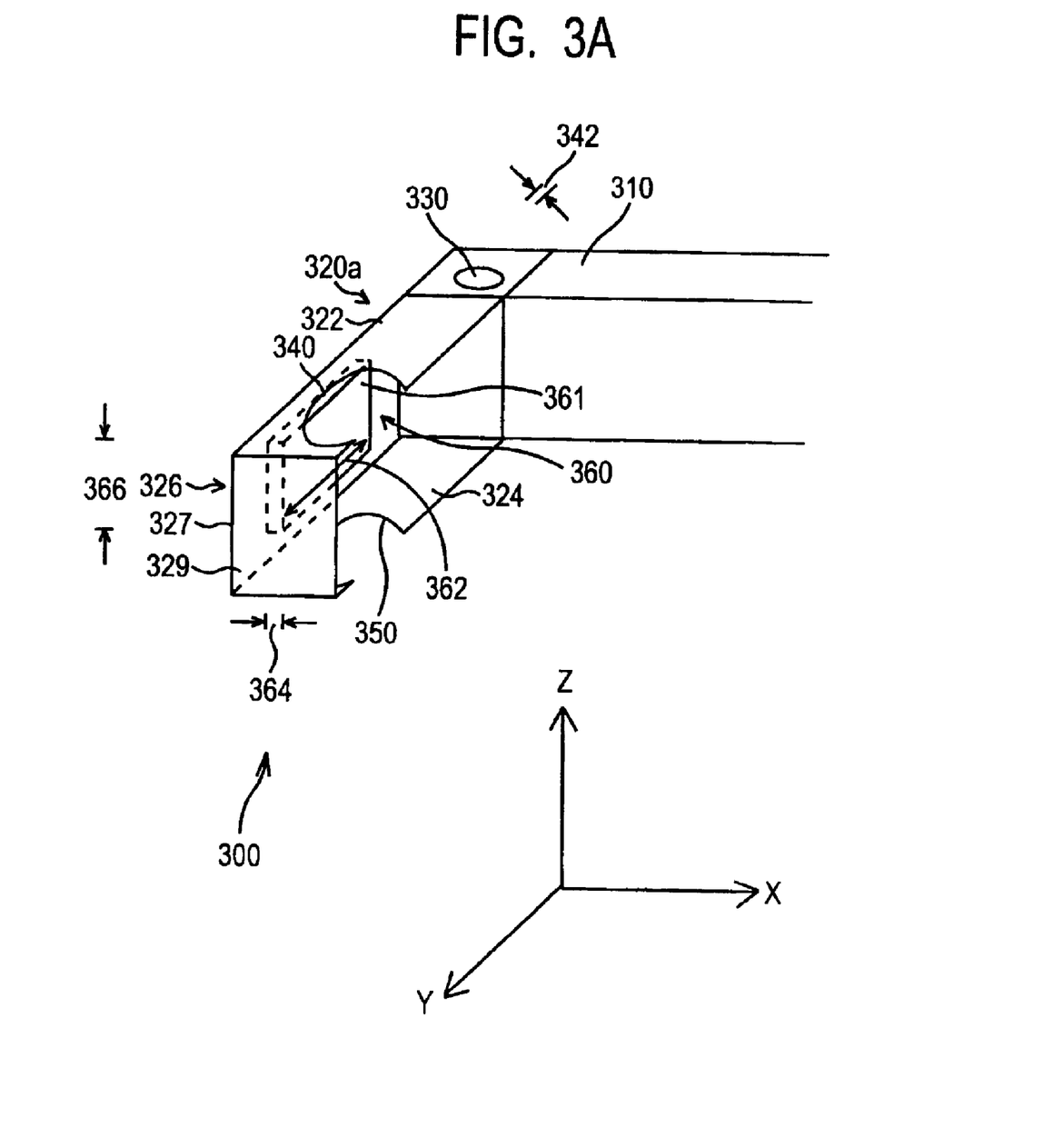
FIG. 3A is a perspective view showing a first embodiment of Applicant's threader block assembly.

FIG. 3A shows Applicant's threader block 300. Applicant's threader block 300 comprises one component of Applicant's tape drive 130 (FIGS. 1, 2)/140 (FIG. 1). Threader block 300 includes first moveable arm 310 and second moveable arm 320a. In certain embodiments, arm 310 comprises a solid member. In certain embodiments, arm 310 comprises a cylindrical structure. In certain embodiments, arm 310 comprises a parallelepiped. In certain embodiments, arm 310 comprises one or more members enclosing an inner hollow core. In certain embodiments, arm 320a comprises a solid member. In certain embodiments, arm 320a comprises a cylindrical structure. In certain embodiments, arm 320a comprises a parallelepiped. In certain embodiments, arm 320a comprises one or more members enclosing an inner hollow core.

Second arm 320a is pivotably attached to first arm 310 at pivot point 330. Arm 320a is rotatable around the Z axis.

Arm 310 is rotatable around one or more of the X axis, Y axis, and/or Z axis. In the illustrated embodiment of FIG. 3A, moveable arm 320a comprises member 322 and opposing member 324 which are continuously connected by member 326. Member 326 includes outer surface 327 and inner surface 329.

Member 322 includes first fixturing device 340. In the illustrated embodiment of FIG. 3A, fixturing device 340 comprises an elliptical-shaped recess disposed in member 322. Member 324 includes second fixturing device 350. In the illustrated embodiment of FIG. 3A, fixturing device 350 comprises an elliptical-shaped recess disposed in member 322.

Arm 320a further includes magnet 360 disposed on inner surface 329. Magnet 360 includes a first surface disposed on inner surface 329 and an opposing second surface 361. In the illustrated embodiment, magnet 360 comprises a parallelepiped. In this illustrated embodiment of FIG. 3A, magnet 360 includes first dimension 362, i.e. the dimension along the Y axis, second dimension 364, i.e. the dimension along the X axis, and third dimension 366, i.e. the dimension along the Z axis. In certain embodiments, dimension 362 substantially equals dimension 366. By substantially equal, Applicant means within about plus or minus ten percent (10%). In other embodiments, dimensions 362 and 366 differ.

In other embodiments, magnet 360 comprises a cylindrical shape having a height 364 and a diameter 362. In other embodiments, magnet 360 comprises an irregular shape.

In certain embodiments, magnet 360 comprises a permanent magnet. In certain embodiments, magnet 360 comprises samarium cobalt, SmCo. In certain embodiments, magnet 360 comprises neodymium iron boron, NdFeB. In certain embodiments, fine SmCo powder is compacted in a die and then sintered. In certain embodiments, the die is integral with inner surface 327 of member 320a. In certain embodiments, the fine SmCo powder is isostatically pressed in a rubber die, wherein that powder is pressed, i.e. compacted, with equal force in all directions.

Figure 4A:
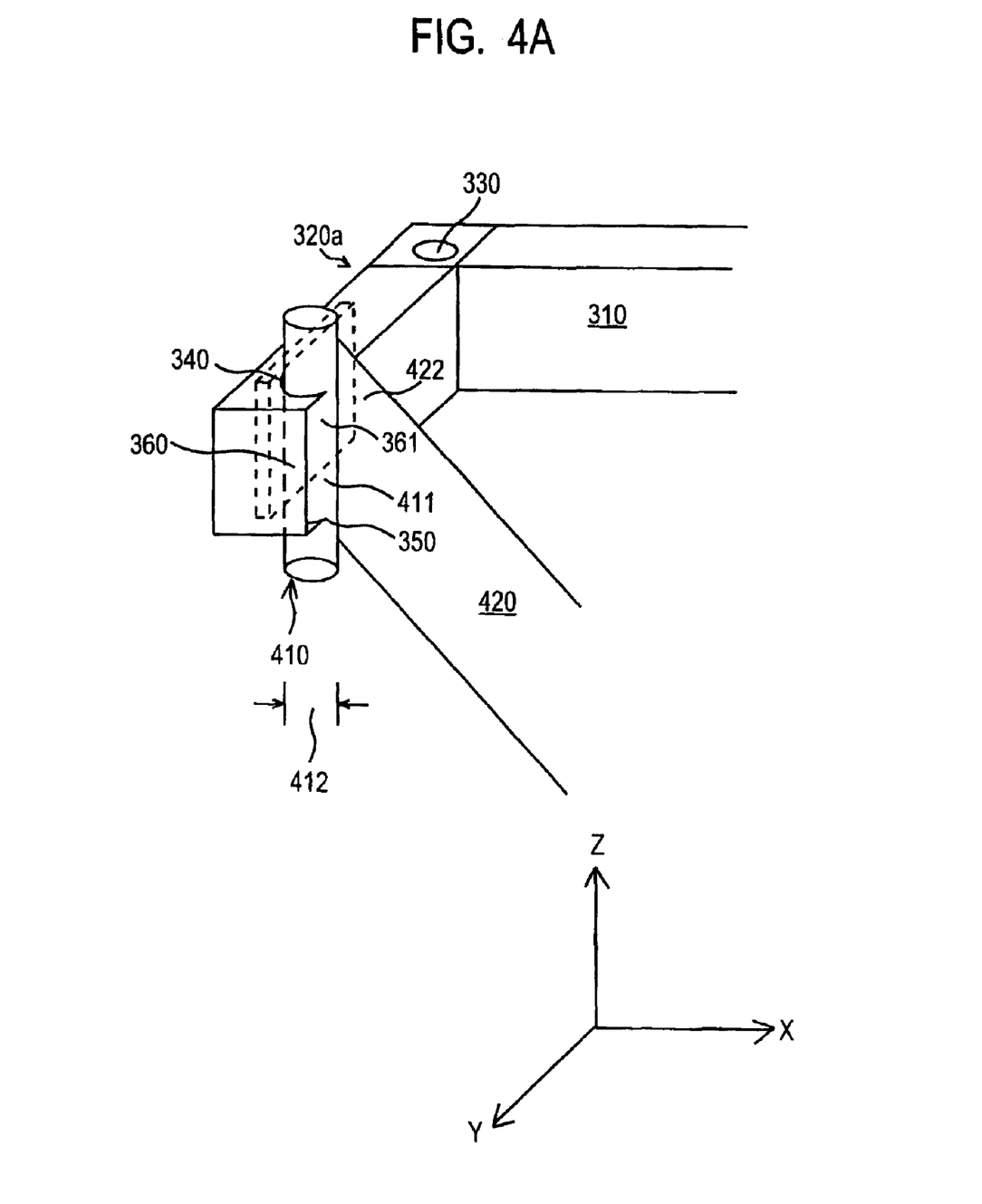
FIG. 4A is a perspective view showing a tape leader pin attached to the threader block assembly of FIG. 3A.

FIG. 4A shows tape leader pin 410 releaseably attached to moveable arm 320a. Leader pin 410 is disposed on a first end 422 of magnetic tape 420. Leader pin 410 comprises a paramagnetic material, i.e. a material having a magnetic susceptibility greater than 0. Leader pin 410 includes outer surface 411 and diameter 412.

In the illustrated embodiment of FIG. 4A, leader pin 410 is removeably disposed in fixturing devices 340 and 350 such that leader pin 410 and surface 361 of magnet 360 have a facing relationship. In certain embodiments, surface 361 physically contacts one or more portions of leader pin surface 411. In other embodiments, leader pin 410 is releaseably attached to arm 320a such that surface 361 of magnet 360 is disposed within about 1 mm or less from a portion of surface 411 of leader pin 410.

In certain embodiments, dimension 362 (FIG. 3A) of magnet 360 is greater than diameter 412. In certain embodiments, dimension 362 is substantially equal to diameter 412, where substantially equal has the meaning recited above. In certain embodiments, dimension 362 is less than diameter 412.

In the illustrated embodiment of FIG. 4A, magnet 360 releaseably attaches leader pin 410 to arm 320a. In certain embodiments, magnet 360 comprises an electromagnet, wherein magnet 360 magnetically attracts leader pin 410 with a first force in a first direction when electromagnet 360 is energized. In these electromagnet embodiments, when electromagnet 360 is deenergized, the first force decreases to about zero, and electromagnet 360 no longer magnetically attracts leader pin 410.

In embodiments wherein magnet 360 comprises a permanent magnet, magnet 360 attracts leader pin 410 with a first force in a first direction, for example along the X axis. In these embodiments, leader pin 410 is released from magnet 360 by moving arm 320a to exert a second force on leader pin 410 in a second direction opposite to the first direction, for example in the -X direction, where that second force is greater than the first force.

Figure 3B:
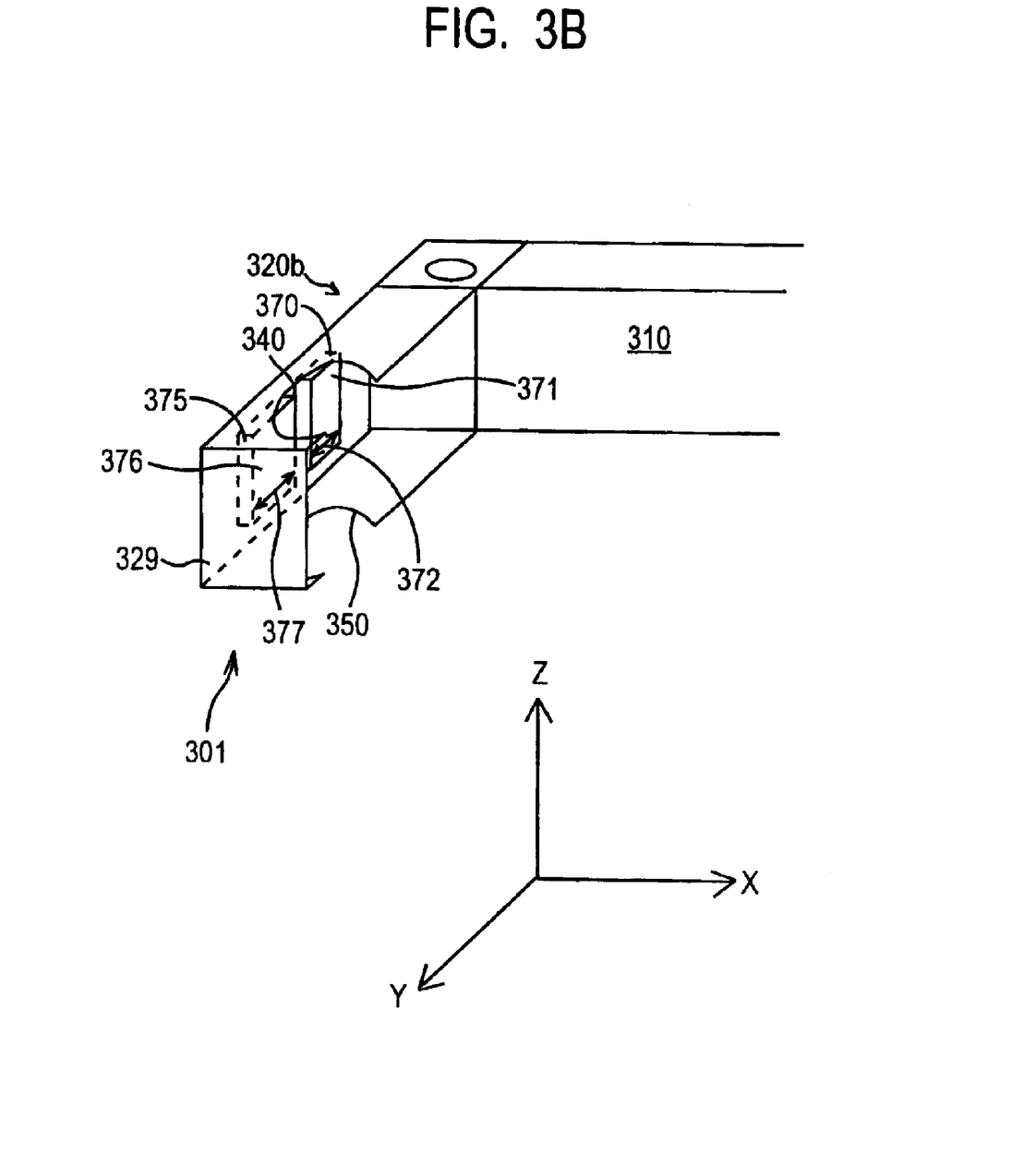
FIG. 3B is a perspective view showing a second embodiment of Applicant's threader block assembly.

Referring now to FIG. 3B, in certain embodiments, Applicant's invention comprises more than one magnet. For example, in the illustrated embodiment of FIG. 3B Applicant's threader block assembly 301 includes moveable arm 320b comprising magnet 370 and magnet 375. Magnet 370 has a first dimension 372, a second dimension 364 (FIG. 3A), and a third dimension 366 (FIG. 3A). In the illustrated embodiment, magnet 370 comprises a parallelepiped. In other embodiments, magnet 370 comprises a cylindrical shape having a height 364 and a diameter 372. In other embodiments, magnet 370 comprises an irregular shape.

In certain embodiments, magnet 370 comprises an electromagnet. In certain embodiments, magnet 370 comprises a permanent magnet. In certain embodiments, magnet 370 comprises samarium cobalt, SmCo. In certain embodiments, magnet 370 comprises neodymium iron boron, NdFeB. In certain embodiments, fine SmCo powder is compacted in a die and then sintered. In certain embodiments, the die is integral with inner surface 327 of member 320b. In certain embodiments, the fine SmCo powder is isostatically pressed in a rubber die, wherein that powder is pressed, i.e. compacted, with equal force in all directions.

Magnet 375 has a first dimension 377, a second dimension 364 (FIG. 3A), and a third dimension 366 (FIG. 3A). In the illustrated embodiment, magnet 375 comprises a parallelepiped. In other embodiments, magnet 375 comprises a cylindrical shape having a height 364 and a diameter 377. In other embodiments, magnet 375 comprises an irregular shape.

In certain embodiments, magnet 375 comprises a permanent magnet. In certain embodiments, magnet 375 comprises samarium cobalt, SmCo. In certain embodiments, magnet 375 comprises neodymium iron boron, NdFeB. In certain embodiments, fine SmCo powder is compacted in a die and then sintered. In certain embodiments, the die is integral with inner surface 327 of member 320. In certain embodiments, the fine SmCo powder is isostatically pressed in a rubber die, wherein that powder is pressed, i.e. compacted, with equal force in all directions.

In certain embodiments, Applicant's tape drive comprises a moveable arm assembly 320b comprising more than two magnets, where each of those two or more magnets comprises a second dimension 364 (FIG. 3A) and a third dimension 366 (FIG. 3A), and where the aggregate first dimensions of those two or more magnets is greater than diameter 411 (FIG. 4A).

Figure 4B:
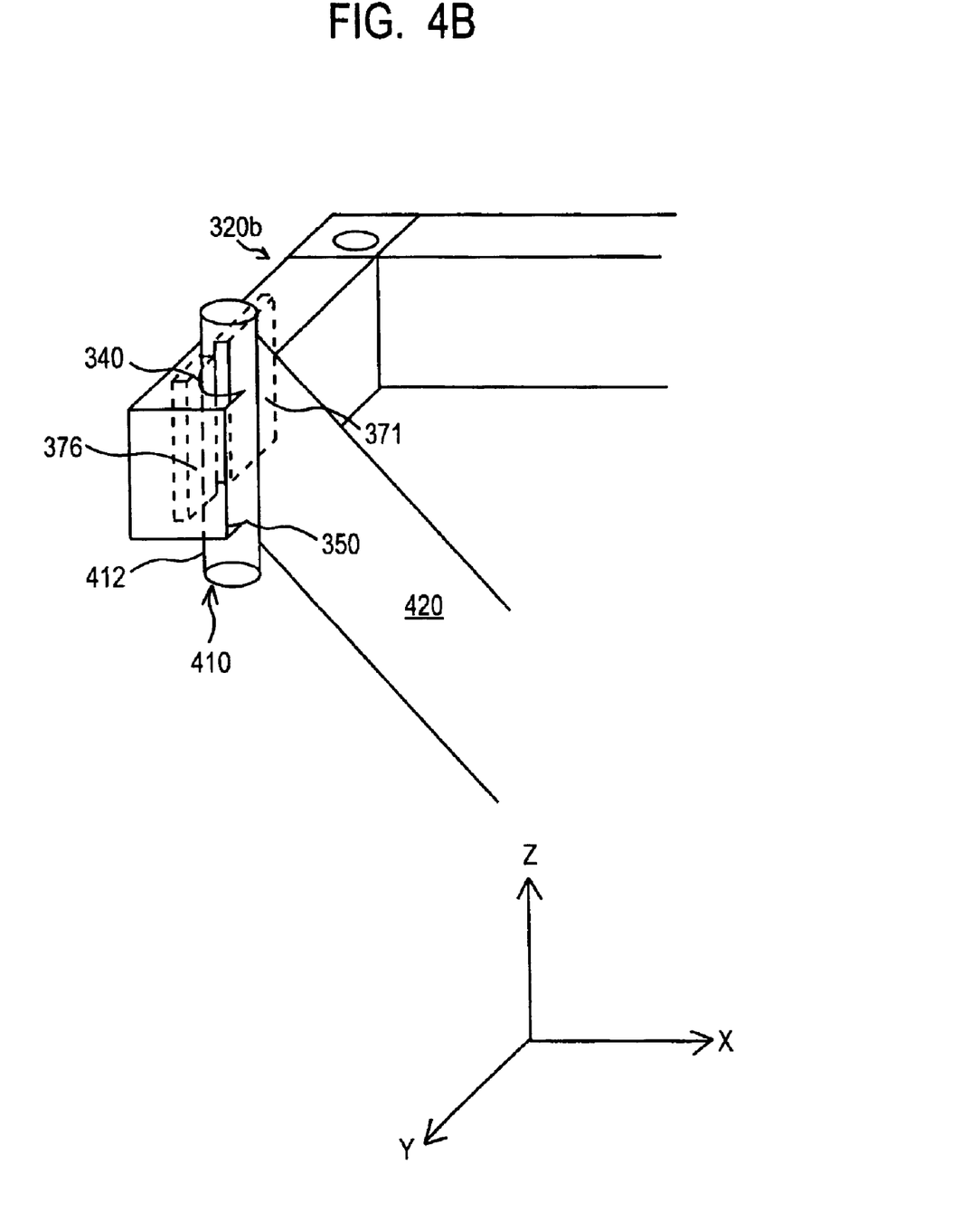
FIG. 4B is a perspective view showing a tape leader pin attached to the threader block assembly of FIG. 3B.

In the illustrated embodiment of FIG. 4B, magnet 370 and magnet 375 releaseably attach leader pin 410 to arm 320b. Magnet 370 attracts leader pin 410 to arm 320b with a first force along a first direction, i.e. along the X axis. Magnet 375 attracts leader pin 410 to arm 310b with a second force along that first direction.

In certain embodiments, both magnet 370 and magnet 375 comprise electromagnets. In certain embodiments, both of magnets 370 and 375 comprise permanent magnets. In certain embodiments, either magnet 370 or magnet 375 comprises a permanent magnet and the other comprises an electromagnet.

In embodiments wherein magnet 370 comprises an electromagnet, magnet 370 magnetically attaches leader pin 410 to arm 320b with the first force in the first direction when electromagnet 370 is energized. In these electromagnet embodiments, when electromagnet 370 is deenergized, the first force decreases to zero, and electromagnet 370 no longer magnetically attracts leader pin 410. In embodiments wherein magnet 375 comprises an electromagnet, magnet 375 magnetically attaches leader pin 410 to arm 320b with the second force in a first direction when electromagnet 375 is energized. In these electromagnet embodiments, when electromagnet 375 is deenergized, the second force decreases to zero, and electromagnet 375 no longer magnetically attracts leader pin 410.

In embodiments wherein magnets 370 and 375 comprise permanent magnets, leader pin 410 is released from arm 320b by moving arm 320b such that leader pin 410 is disengaged from fixturing devices 340 and 350, and such that a third force is exerted on leader pin 410 in a second direction, wherein that second direction is opposite to the first direction, i.e. in the -X direction in FIG. 4B, and wherein that third force is greater than the combined first force and second force. In embodiments wherein magnets 370 and 375 comprise electromagnets, leader pin 410 is released from arm 320b by deenergizing those electromagnets and by moving arm 320b such that leader pin 410 is disengaged from fixturing devices 340 and 350.

In embodiments wherein one of magnets 370 and 375 comprises a permanent magnet, leader pin 410 is released from arm 320b by deenergizing the electromagnet and moving arm 320b to exert a third force on leader pin 410 in a second direction opposite to the first direction, for example in the -X direction of FIG. 4B, where that third force is greater than the remaining magnetic force.

Figure 3C:
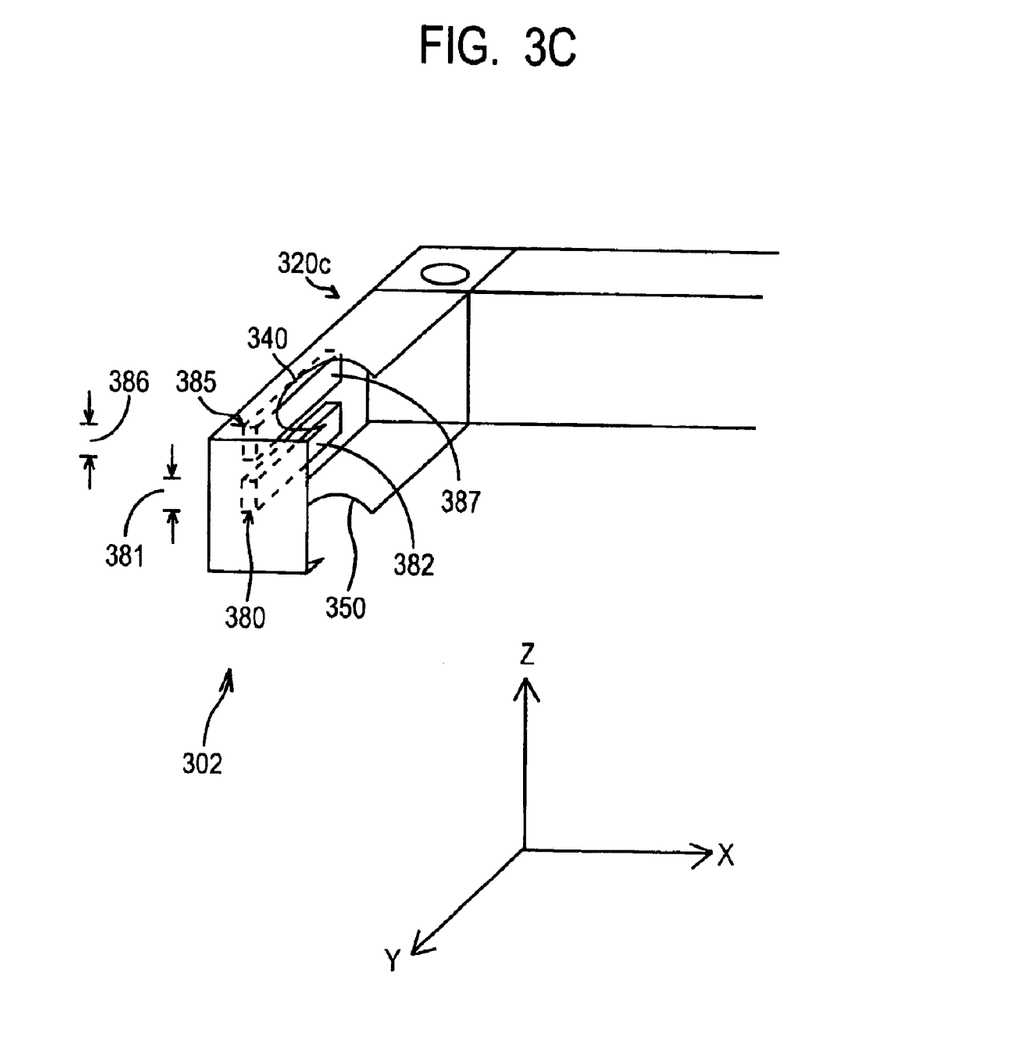
FIG. 3C is a perspective view showing a third embodiment of Applicant's threader block assembly.

In the illustrated embodiment of FIG. 3C, Applicant's threader block assembly includes moveable arm 320c comprising magnet 380 and magnet 385. Magnet 380 has a first dimension 362 (FIG. 3A), a second dimension 364 (FIG. 3A), and a third dimension 381. In the illustrated embodiment, magnet 380 comprises a parallelepiped. In other embodiments, magnet 380 comprises a cylindrical shape having a height 364 and a diameter 381. In other embodiments, magnet 380 comprises an irregular shape.

In certain embodiments, magnet 380 comprises an electromagnet. In certain embodiments, magnet 380 comprises a permanent magnet. In certain embodiments, magnet 380 comprises samarium cobalt, SmCo. In certain embodiments, magnet 380 comprises neodymium iron boron, NdFeB. In certain embodiments, fine SmCo powder is compacted in a die and then sintered. In certain embodiments, the die is integral with inner surface 327 of member 320c. In certain embodiments, the fine SmCo powder is isostatically pressed in a rubber die, wherein that powder is pressed, i.e. compacted, with equal force in all directions.

Magnet 385 has a first dimension 362 (FIG. 3A), a second dimension 364 (FIG. 3A), and a third dimension 386. In the illustrated embodiment, magnet 385 comprises a parallelepiped. In other embodiments, magnet 385 comprises a cylindrical shape having a height 364 and a diameter 386. In other embodiments, magnet 385 comprises an irregular shape.

In certain embodiments, magnet 385 comprises an electromagnet. In certain embodiments, magnet 385 comprises a permanent magnet. In certain embodiments, magnet 385 comprises samarium cobalt, SmCo. In certain embodiments, magnet 385 comprises neodymium iron boron, NdFeB. In certain embodiments, fine SmCo powder is compacted in a die and then sintered. In certain embodiments, the die is integral with inner surface 327 of member 320c. In certain embodiments, the fine SmCo powder is isostatically pressed in a rubber die, wherein that powder is pressed, i.e. compacted, with equal force in all directions.

In certain embodiments, Applicant's tape drive comprises a moveable arm assembly 320c comprising more than two magnets, where each of those two or more magnets comprises a first dimension 362 and a second dimension 364 (FIG. 3A), and where the aggregate third dimensions of those two or more magnets substantially equals dimension 366 (FIG. 3A).

Figure 4C:
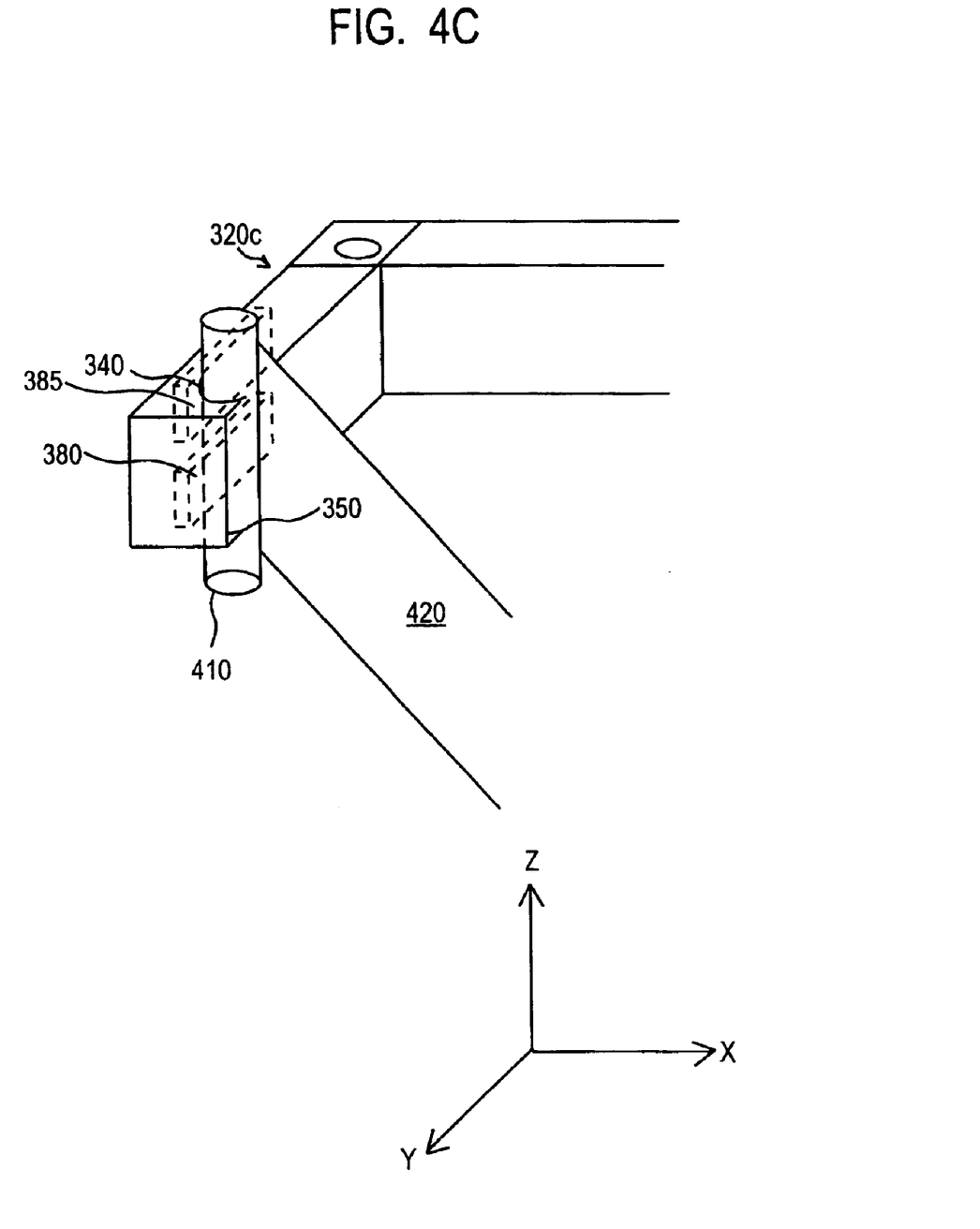
FIG. 4C is a perspective view showing a tape leader pin attached to the threader block assembly of FIG. 3C.

In the illustrated embodiment of FIG. 4C, magnet 380 and magnet 385 releaseably attach leader pin 410 to arm 320c. Magnet 380 attracts leader pin 410 to arm 320c with a first force along a first direction, i.e. along the X axis. Magnet 385 attracts leader pin 410 to arm 310c with a second force along that first direction.

In certain embodiments, both magnet 380 and magnet 385 comprise electromagnets. In certain embodiments, both of magnets 380 and 385 comprise permanent magnets. In certain embodiments, either magnet 380 or magnet 385 comprises a permanent magnet and the other comprises an electromagnet.

In embodiments wherein magnet 380 comprises an electromagnet, magnet 380 magnetically attaches leader pin 410 to arm 320c with the first force in a first direction when electromagnet 380 is energized. In these electromagnet embodiments, when electromagnet 380 is deenergized, the first force decreases to zero, and electromagnet 380 no longer magnetically attracts leader pin 410. In embodiments wherein magnet 385 comprises an electromagnet, magnet 385 magnetically attaches leader pin 410 to arm 320c with the second force in a first direction when electromagnet 385 is energized. In these electromagnet embodiments, when electromagnet 385 is deenergized, the second force decreases to zero, and electromagnet 385 no longer magnetically attracts leader pin 410.

In embodiments wherein magnets 380 and 385 comprise permanent magnets, leader pin 410 is released from arm 320c by moving arm 320c such that leader pin 410 is disengaged from fixturing devices 340 and 350, and such that a third force is exerted on leader pin 410 in a second direction, wherein that second direction is opposite to the first direction, i.e. in the −X direction in FIG. 4C, and wherein that third force is greater than the combined first force and second force. In embodiments wherein magnets 380 and 385 comprise electromagnets, leader pin 410 is released from arm 320c by deenergizing those electromagnets and by moving arm 320c such that leader pin 410 is disengaged from fixturing devices 340 and 350.

In embodiments wherein one of magnets 380 and 385 comprises a permanent magnet, leader pin 410 is released from arm 320c by deenergizing the electromagnet and moving arm 320c to exert a third force on leader pin 410 in a second direction opposite to the first direction, for example in the −X direction of FIG. 4C, where that third force is greater than the remaining magnetic force.

Figure 5:
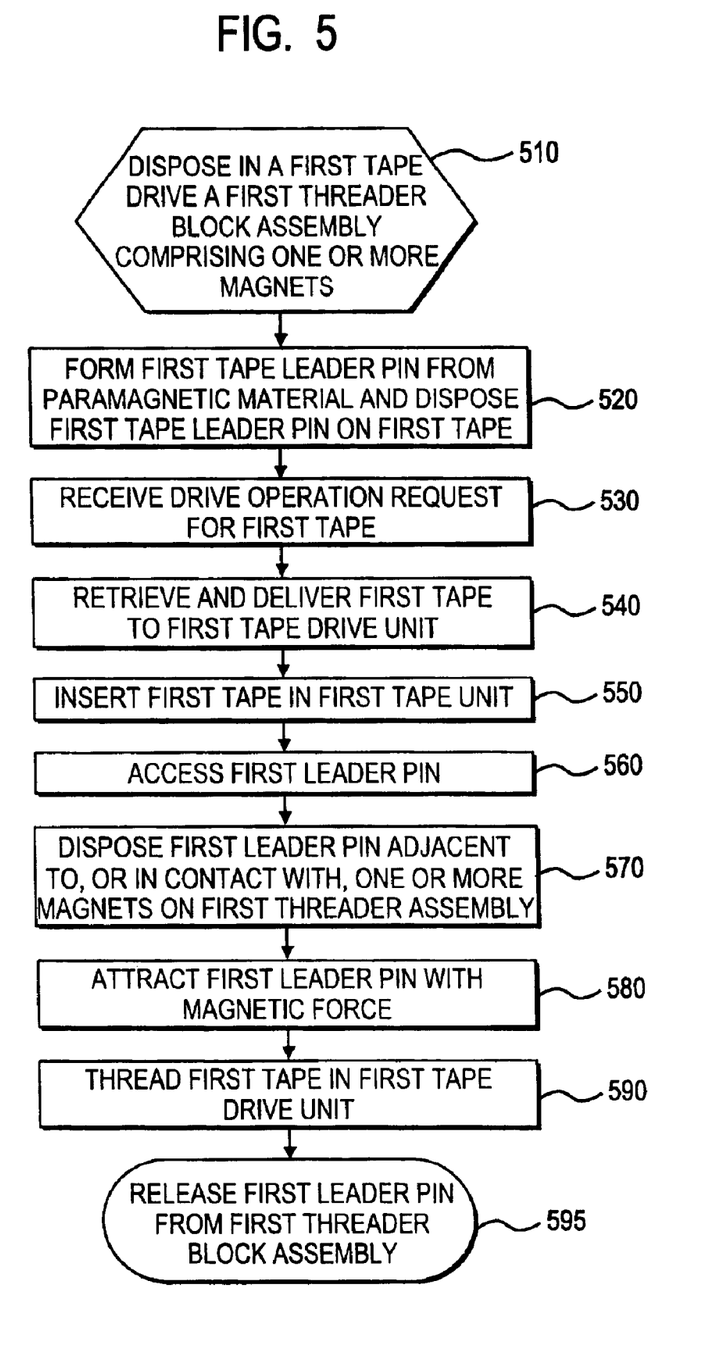
FIG. 5 is a flowchart summarizing the steps in Applicant's method.

Applicant's invention includes a method to releaseably attach a tape leader pin, such as leader pin 410 (FIGS. 4A, 4B, 4C), to Applicant's threader block 300 (FIGS. 3A, 4A), 301 (FIGS. 3B, 4B), or 302 (FIGS. 3C, 4C), disposed in Applicant's tape drive 130 (FIGS. 1, 2)/140 (FIG. 1) which is disposed in Applicant's data storage and retrieval system 100 (FIG. 1)/200 (FIG. 2). FIG. 5 summarizes the steps in Applicant's method.

In step 510, Applicant's method disposes in a first tape drive a threader block assembly, such as assembly 300 (FIG. 3A), or 301 (FIG. 3B), or 302 (FIG. 3C), which includes one or more magnets, such as magnets 360 (FIG. 3A), 370 (FIG. 3B), 375 (FIG. 3B), 380 (FIG. 3C), and/or 385 (FIG. 3C). In certain embodiments, one or more of those one or more magnets comprise permanent magnets. In certain embodiments, one or more of those one or more magnets comprise electromagnets.

In step 520, Applicant's method forms a tape leader pin comprising a paramagnetic material and disposes that tape leader pin on one end of a first magnetic tape medium.

In step 530, Applicant's tape drive receives a request from one or more host computers, such as host computer 195 (FIG. 1), to perform a drive operation using the first tape medium and the first tape drive. Such a drive operation may comprise, for example, a write operation, a read operation, an erase operation, and the like. In step 540, Applicant's method causes an accessor, such as accessor 110 (FIG. 1), to retrieve the first tape from its storage slot and deliver the first tape to the first tape drive. In certain embodiments, the first tape medium is disposed in a housing, i.e. a tape cartridge.

In step 550, the first tape is inserted in the first tape drive. In step 560, Applicant's method causes the first threader block, such as threader block 300/301/302 to access and fixture the first leader pin, such as leader pin 410 (FIGS. 4A, 4B, 4C), disposed on the first magnetic tape, such as tape 420 (FIGS. 4A, 4B, 4C).

In step 570, the first leader pin is disposed adjacent the one or more magnets disposed on the first threader block assembly. In step 580, the one or more magnets attract the first leader pin in a first direction with a magnetic force. In certain embodiments, step 580 includes energizing one or more electromagnets disposed on the first threader block assembly. In step 590, the first tape is threaded in the first tape drive.

In step 595, the first threader block releases the first leader pin. In certain embodiments, step 595 includes deenergizing one or more electromagnets disposed on the first threader block assembly. In certain embodiments, step 595 includes moving one or more moveable arms comprising the first threader block assembly to exert a mechanical force on the tape leader pin in a second direction, wherein that second direction is opposite to the first direction, and wherein the mechanical force is greater than the magnetic force.

While the preferred embodiments of the present invention have been illustrated in detail, it should be apparent that modifications and adaptations to those embodiments may occur to one skilled in the art without departing from the scope of the present invention as set forth in the following claims.

We claim:

1. A threader block assembly, comprising:
   a first moveable arm;
   a second moveable arm pivotally connected to said first moveable arm, wherein said second moveable arm comprises a fixturing device capable of releaseably attaching a tape leader pin disposed on one end of a magnetic tape; and
   a first magnet disposed on said second moveable arm.

2. The threader block assembly of claim 1, wherein said first magnet comprises a permanent magnet.

3. The threader block assembly of claim 2, wherein said permanent magnet comprises samarium cobalt.

4. The threader block assembly of claim 1, wherein said magnet comprises an electromagnet.

5. The threader block assembly of claim 1, further comprising a second magnet.

6. The threader block assembly of claim 5, wherein said second magnet is selected from the group consisting of a permanent magnet and an electromagnet.

7. A threader block assembly, comprising:

a first moveable arm;

a second moveable arm pivotally connected to said first moveable arm;

a first fixturing device disposed on said second moveable arm;

a second fixturing device disposed on said second moveable arm;

wherein said first fixturing device and said second fixturing device are capable of releaseably attaching a tape leader pin disposed on one end of a magnetic tape; and one or more magnets disposed on said second moveable arm.

8. A tape drive comprising a threader block assembly, wherein said threader block assembly comprises:

a first moveable arm;

a second moveable arm pivotally connected to said first moveable arm, wherein said second moveable arm comprises a fixturing device capable of releaseably attaching a tape leader pin disposed on one end of a magnetic tape; and a first magnet disposed on said second moveable arm.

9. The tape drive of claim 8, wherein said first magnet is selected from the group consisting of a permanent magnet and an electromagnet.

10. The tape drive of claim 8, further comprising a second magnet.

11. The tape drive of claim 10, wherein said second magnet is selected from the group consisting of a permanent magnet and an electromagnet.

12. A data storage and retrieval system comprising one or more tape drives comprising a threader block assembly, wherein said threader block assembly comprises:

a first moveable arm;

a second moveable arm pivotally connected to said first moveable arm, wherein said second moveable arm comprises a fixturing device capable of releaseably attaching a tape leader pin disposed on one end of a magnetic tape; and a first magnet disposed on said second moveable arm.

13. The data storage and retrieval system of claim 12, wherein said first magnet is selected from the group consisting of a permanent magnet and an electromagnet.

14. The data storage and retrieval system of claim 12, further comprising a second magnet.

15. The data storage and retrieval system of claim 14, wherein said second magnet is selected from the group consisting of a permanent magnet and an electromagnet.

16. A method to attach a tape leader pin to a threader block assembly disposed in a tape drive, wherein said leader pin is disposed on one end of a magnetic tape, comprising the steps of:

disposing a first magnet on said threader block assembly, forming said leader pin from a paramagnetic material;

attaching said leader pin to said threader block assembly with a magnetic force.

17. The method of claim 16, wherein said threader block assembly further comprises a first moveable arm and a second moveable arm, further comprising the steps of disposing said first magnet on said second moveable arm.

18. The method of claim 16, further comprising the step of forming said first magnet from samarium cobalt.

19. The method of claim 16, wherein said first magnet comprises an electromagnet; further comprising the step of energizing said electromagnet.

20. The method of claim 16, further comprising the step of disposing a second magnet on said threader block assembly.

21. The method of claim 20, further comprising the step of forming said second magnet from samarium cobalt.

22. The method of claim 20, wherein said second magnet comprises an electromagnet, further comprising the step of energizing said electromagnet.

* * * * *